United States Patent
Takizawa et al.

(10) Patent No.: US 10,717,650 B2
(45) Date of Patent: Jul. 21, 2020

(54) METHOD FOR PURIFYING DIFLUOROPHOSPHATE

(71) Applicant: Kanto Denka Kogyo Co., Ltd., Tokyo (JP)

(72) Inventors: Hiroki Takizawa, Gunma (JP); Kazuhide Yoshiyama, Gunma (JP); Keisuke Kude, Okayama (JP); Wataru Kashikura, Gunma (JP); Takuro Abe, Gunma (JP); Mitsuhara Shimoda, Gunma (JP); Osamu Omae, Okayama (JP); Hiroyuki Uehara, Gunma (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 128 days.

(21) Appl. No.: 15/562,223

(22) PCT Filed: Apr. 26, 2016

(86) PCT No.: PCT/JP2016/062982
§ 371 (c)(1),
(2) Date: Sep. 27, 2017

(87) PCT Pub. No.: WO2016/175186
PCT Pub. Date: Nov. 3, 2016

(65) Prior Publication Data
US 2018/0118570 A1    May 3, 2018

(30) Foreign Application Priority Data

Apr. 27, 2015  (JP) .................. 2015-090082

(51) Int. Cl.
| | | |
|---|---|---|
| C01B 25/455 | (2006.01) | |
| H01M 10/0525 | (2010.01) | |
| H01M 10/0567 | (2010.01) | |
| H01M 10/0568 | (2010.01) | |

(52) U.S. Cl.
CPC ....... C01B 25/455 (2013.01); H01M 10/0525 (2013.01); H01M 10/0567 (2013.01); H01M 10/0568 (2013.01); C01P 2006/40 (2013.01); C01P 2006/80 (2013.01); H01M 2300/0025 (2013.01); Y02T 10/7011 (2013.01)

(58) Field of Classification Search
CPC ......... H01M 10/0525; H01M 10/0567; H01M 10/0568; H01M 2300/0025; C01B 25/455
See application file for complete search history.

(56) References Cited

U.S. PATENT DOCUMENTS

| | | |
|---|---|---|
| 9,593,016 B2 | 3/2017 | Kato et al. |
| 2008/0305402 A1* | 12/2008 | Kato ............... C01B 25/455 429/338 |
| 2010/0323240 A1 | 12/2010 | Tsujioka et al. |
| 2011/0111288 A1* | 5/2011 | Nishida ........... C01B 25/455 429/199 |
| 2012/0100435 A1 | 4/2012 | Kato et al. |
| 2015/0064091 A1* | 3/2015 | Nishida ........... C01B 25/455 423/301 |
| 2016/0075557 A1 | 3/2016 | Yahata et al. |
| 2016/0090306 A1 | 3/2016 | Kon et al. |
| 2017/0197834 A1* | 7/2017 | Abe ............... C01B 25/455 |

FOREIGN PATENT DOCUMENTS

| | | |
|---|---|---|
| CN | 101847754 A | 9/2010 |
| EP | 0735983 B1 | 3/1999 |
| JP | 11-67270 | 3/1999 |
| JP | 2005-053727 | 3/2005 |
| JP | 2008-222484 | 9/2008 |
| JP | 2010-155774 | 7/2010 |
| JP | 2014-015343 | 1/2014 |
| JP | 2014-132576 | 7/2014 |
| JP | 2015-013795 | 1/2015 |
| JP | 2015-013796 | 1/2015 |
| JP | 2015-044701 | 3/2015 |

OTHER PUBLICATIONS

International Search Report, PCT/JP2016/062982, dated Jul. 12, 2016.

* cited by examiner

*Primary Examiner* — Ngoc-Yen Nguyen
(74) *Attorney, Agent, or Firm* — Young & Thompson

(57) ABSTRACT

Disclosed is a method for purifying a difluorophosphate, the method including mixing a difluorophosphate containing an impurity with at least one treatment agent selected from the group consisting of carbonates, hydroxides, and halides of alkali metals or alkali earth metals and amines to isolate the impurity. It is preferable that the method further include filtering off, by filtration, a salt or a complex that has been formed by allowing the impurity to be mixed with the treatment agent. Preferably, a carbonate, a hydroxide, or a halide of an alkali metal is used as the treatment agent, and more preferably a carbonate, a hydroxide, or a halide of lithium is used as the treatment agent.

20 Claims, No Drawings

METHOD FOR PURIFYING DIFLUOROPHOSPHATE

TECHNICAL FIELD

The present invention relates to a method by which a difluorophosphate expected to be used for a solvent for an electrolyte solution and an additive for a lithium ion secondary battery, an intermediate of a functional material, an intermediate of a drug, and the like can be purified in a simple manner so as to have a high purity.

BACKGROUND ART

Nowadays, lithium ion secondary batteries are used in a wide variety of applications ranging from power sources for relatively small electronic devices such as mobile phones, digital cameras, and personal computers to those for large-sized machinery such as electric automobiles and power tools. The diversified demand for performance of the lithium ion secondary batteries has been increasing, and adaptation for various fields is under energetic study. Lithium ion secondary batteries for the in-vehicle applications among others are required to achieve performance on the assumption that they would be used in harsh environments.

In particular, there has been demand for improvement in power density and energy density in view of high performance, and also demand for suppression of capacity degradation at high temperatures and low temperatures and improvement in cycle life and safety in view of high reliability.

Various attempts have been made to solve the above-mentioned problems, leading to improvements. As means for improvement, there have been examined optimization of an active material used for a cathode material or an anode material, combinations and blend ratios of salts and solvents that constitute an electrolyte solution, combinations and blend ratios of additives for improving characteristics, and the like.

Degradation and deterioration of a non-aqueous electrolyte solution for a lithium ion secondary battery can be suppressed by appropriately selecting combinations and blend ratios of the above-mentioned constituent members. Such a suppressing effect is a factor in significantly improving the characteristics of the lithium ion secondary battery such as performance and reliability.

Under these circumstances, Patent Literature 1 discloses that when a non-aqueous electrolyte solution containing as an additive at least one selected from the group consisting of lithium monofluorophosphate and lithium difluorophosphate is used, the additive reacts with lithium used as an electrode to form a good-quality coating on the surface of the cathode and the surface of the anode, and that these coatings suppress the contact between active materials in a charging state and an organic solvent to thereby suppress the degradation of the non-aqueous electrolyte solution due to the contact between the active materials and the electrolyte solution, thus improving the storage characteristics of the battery.

Some methods for producing a difluorophosphate such as lithium difluorophosphate described above have been examined. For example, Patent Literature 2 discloses a method involving a reaction between a borate and lithium hexafluorophosphate. Patent Literature 3 discloses a method including adding a halide to lithium hexafluorophosphate, and then reacting the mixture with water in a non-aqueous solvent. Patent Literature 4 discloses a method involving a reaction between a phosphorus oxoacid, a hexafluorophosphate, and an alkali salt in the presence of hydrogen fluoride to produce a difluorophosphate. Patent Literature 5 discloses a method including reacting phosphorous oxychloride with lithium carbonate to synthesize lithium dichlorophosphate and then bringing hydrogen fluoride into contact therewith to produce lithium difluorophosphate. On the other hand, purification methods have also been examined, and, for example, Patent Literature 6 describes a method including bringing hydrogen fluoride into contact with a difluorophosphate. However, in this method, a hexafluorophosphate may be produced as a by-product and degraded in the system, and this degradation causes coloration of crystals of the difluorophosphate. Moreover, the effect of reducing a free acid component (acidic impurity) and the effect of reducing an insoluble residue are small in this method, and it is thus difficult to obtain a difluorophosphate having a high purity. Therefore, it is difficult to say that this method is efficient.

Moreover, there also are needs for methods for efficiently producing and purifying, on an industrial scale, difluorophosphates other than a lithium salt, such as sodium difluorophosphate, potassium difluorophosphate, and ammonium difluorophosphate.

CITATION LIST

Patent Literature

Patent Literature 1: JP H11-67270A
Patent Literature 2: JP 2005-53727A
Patent Literature 3: US 2010323240
Patent Literature 4: JP 2010-155774A
Patent Literature 5: JP 2014-015343A
Patent Literature 6: US 2016075557

SUMMARY OF INVENTION

The present invention has been made in order to solve the foregoing problems, and an object thereof is to provide a method for purifying a difluorophosphate to a high purity without requiring complicated operations.

The inventors of the present invention have conducted intensive research in order to solve the foregoing problems. As a result, it has been found that an impurity contained in a difluorophosphate can be isolated by adding at least one treatment agent selected from the group consisting of carbonates, hydroxides, and halides of alkali metals or alkali earth metals and amines to the difluorophosphate containing the impurity, and thus the present invention has been accomplished. That is to say, the present invention provides the following.

[1] A method for purifying a difluorophosphate, the method comprising:
adding at least one treatment agent selected from the group consisting of carbonates, hydroxides, and halides of alkali metals or alkali earth metals and amines to a difluorophosphate containing an impurity to isolate the impurity.

[2] The method for purifying a difluorophosphate according to [1], further comprising filtering off, by filtration, a salt or a complex into which the impurity has been transformed with the treatment agent.

[3] The method for purifying a difluorophosphate according to [1] or [2], wherein the treatment agent is a carbonate, a hydroxide, or a halide of an alkali metal.

[4] The method for purifying a difluorophosphate according to any one of [1] to [3], wherein the treatment agent is a carbonate, a hydroxide, or a halide of lithium.

[5] The method for purifying a difluorophosphate according to any one of [1] to [4], wherein a reaction between the impurity and the treatment agent is conducted in a solvent.

[6] A non-aqueous electrolyte solution for a secondary battery, comprising a non-aqueous solvent, and at least a hexafluorophosphate as an electrolyte salt and a difluorophosphate in the non-aqueous solvent, at least a portion of the difluorophosphate being a difluorophosphate purified by the method according to any one of [1] to [5] so as to have an impurity content of 1 wt % or less.

Depending on the production methods, the above-described free acid component (acidic impurity) may be present in the form of monofluorophosphoric acid, a hydrogen salt (acid salt) such as a hydrogen monofluorophosphate, a dihydrogen phosphate, or a monohydrogen phosphate, an acidic oxide such as $CO_2$, $P_2O_5$, $P_2O_3$, or $SiO_2$, an acid gas such as HF, HCl, or HBr, or the like.

Although the purification mechanism in the present invention is not clear, it is supposed that the following phenomenon will occur.

For example, it is considered that a reaction as shown below proceeds in a case where lithium carbonate as the treatment agent is used for a lithium difluorophosphate containing lithium monohydrogen monofluorophosphate as a free acid component (acidic impurity).

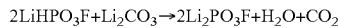

$2LiHPO_3F + Li_2CO_3 \rightarrow 2Li_2PO_3F + H_2O + CO_2$ $Li_2PO_3F$ has a lower solubility than $LiHPO_3F$ and can be removed by filtration, decantation, or the like. Moreover, $H_2O$, which is produced as a by-product, can be distilled off in a simple manner by heating, and $CO_2$, which is produced as a by-product, can be easily removed in the form of a gas.

The kind of the above-described insoluble residue depends on the production methods, and typical examples thereof includes salts such as halides, phosphates, carbonates, hydroxides, and sulfide salts, crystalline oxides such as $SiO_2$ and $P_2O_5$, and high molecular compounds such as polyphosphoric acid.

DESCRIPTION OF EMBODIMENTS

Hereinafter, preferred embodiments of the method for purifying a difluorophosphate according to the present invention will be described in detail, but the present invention is not limited thereto.

The method for purifying a difluorophosphate according to the present invention includes mixing a difluorophosphate containing an impurity with a treatment agent for reacting to isolate the impurity.

The difluorophosphate that is used in the present invention can be produced using a known method.

At least one compound selected from the following can be used as the treatment agent that is used for purification of the difluorophosphate:

1) Salts; and
2) Amines

These compounds can be used as the treatment agent without limitation as long as they are of a commercially available grade.

Specific examples of the salts include carbonates, hydroxides, and halides of alkali metals or alkali earth metals.

Specific examples of the alkali metals include lithium, sodium, potassium, rubidium, and cesium. It is preferable to select lithium, sodium, or potassium in view of availability and superiority in cost.

Specific examples of the alkali earth metals include beryllium, magnesium, calcium, strontium, and barium. It is preferable to select magnesium or calcium in view of availability, superiority in cost, and safety.

Examples of the amines include poly(4-vinylpyridine), triethylamine, and N,N,N',N'-tetramethylethylenediamine.

Examples of the halides include fluorides, chlorides, bromides, and iodides. It is preferable to select a fluoride or a chloride in view of ease in removing a by-product.

A carbonate, a hydroxide, or a halide of an alkali metal is preferable as the treatment agent, and furthermore, a carbonate, a hydroxide, or a halide of lithium is more preferable. In particular, these compounds are preferred in the order of a carbonate>a hydroxide>a halide, in view of the type of acid that can be treated, availability, alkalinity, and the like.

In the purification method according to the present invention, mixing (contact) of the difluorophosphate with the treatment agent may be performed in the absence of a solvent or in the presence of an appropriate solvent. When a solvent is used, both the difluorophosphate and the treatment agent may be undissolved or dissolved in the solvent, or only one of the difluorophosphate and the treatment agent may be dissolved in the solvent. It is preferable to use a solvent in which only the difluorophosphate is soluble in view of uniformity, and ease of treatment operations.

There is no particular limitation on the solvent as long as the solvent is not involved in the reaction. Examples thereof include organic solvents such as carbonate esters, esters, esters of phosphorus acids, ethers, nitriles, amide compounds, alcohols, and alkanes. Specific examples thereof include the following compounds.

Examples of the carbonate esters include dimethyl carbonate, ethyl methyl carbonate, diethyl carbonate, ethylene carbonate, propylene carbonate, and butylene carbonate. It is preferable to use dimethyl carbonate, ethyl methyl carbonate, diethyl carbonate, ethylene carbonate, or propylene carbonate.

Examples of the esters (i.e., esters other than carbonate esters) include alkyl acetates such as methyl acetate, ethyl acetate, and butyl acetate. The number of carbon atoms in the alkyl group is preferably between 1 and 8 inclusive, more preferably between 1 and 6 inclusive, and even more preferably between 1 and 4 inclusive. Ethyl acetate and butyl acetate are especially preferable.

Examples of the esters of phosphorus acid include trialkyl esters of phosphoric acid, such as trimethyl phosphate and triethyl phosphate, and trialkyl esters of phosphorous acid, such as trimethyl phosphite and diethyl methyl phosphite. The number of carbon atoms in the alkyl group of phosphoric acid and phosphorous acid is preferably between 1 and 5 inclusive and more preferably between 1 and 3 inclusive. Moreover, the alkyl groups of phosphoric acid and phosphorous acid may be constituted of a combination of the same alkyl groups or a combination of different alkyl groups. Examples of the combination of the same alkyl groups include a combination in which all of the alkyl groups are methyl groups, a combination in which all of the alkyl groups are ethyl groups, and a combination in which all of the alkyl groups are propyl groups. Examples of the combination of different alkyl groups include a combination of one methyl group and two ethyl groups, a combination of one ethyl group and two methyl groups, a combination of one methyl group and two propyl groups, a combination of one propyl group and two methyl groups, a combination of one ethyl group and two propyl groups, and a combination of one propyl group and two ethyl groups.

Examples of the ethers include diethyl ether, dimethoxyethane, tetrahydrofuran, and 2-methyltetrahydrofuran. It is preferable to use dimethoxyethane.

Examples of the nitrile compounds include acetonitrile.

Examples of the amide compounds include dimethylformamide

Examples of the alcohols include alkyl alcohols such as methyl alcohol, ethyl alcohol, propyl alcohol, and butyl alcohol. The number of carbon atoms in the alkyl group is preferably between 1 and 8 inclusive, more preferably between 1 and 6 inclusive, and even more preferably between 1 and 4 inclusive.

Examples of the alkanes include straight-chain saturated hydrocarbons such as n-hexane and n-heptane. The number of carbon atoms in the saturated hydrocarbon is preferably between 5 and 12 inclusive, more preferably between 5 and 10 inclusive, and even more preferably between 6 and 8 inclusive.

Among these organic solvents, the carbonate ester, the ester, or the ether is preferably used in view of using the resulting difluorophosphate as an additive for an electrolyte solution for a battery, particularly an additive for an electrolyte solution for a secondary battery, the possibility of remaining in the solvent, and the like.

The organic solvents may be used singly or in combinations of two or more. When two or more organic solvents are used, it is preferable that a good solvent and a poor solvent for a difluorophosphate be mixed in any given ratio, or that the organic solvents be mixed so that the resultant mixture has the same composition as that of the electrolyte solution to be used in a battery.

In the purification method according to the present invention, there is no particular limitation on a method for adding the treatment agent, and the treatment agent may be added collectively, added gradually, added divisionally, or added in the form of a mixture of the treatment agent and any given organic solvent. In particular, in view of simplicity and ease of operations, it is preferable to add the treatment agent collectively or in the form of a mixture.

In the purification method according to the present invention, the amounts of the difluorophosphate containing the impurity and the treatment agent to be used can be set arbitrarily, although these amounts depend on the content of the free acid component (acidic impurity) in the impurity. There is no particular limitation on the amount of the treatment agent to be added, because an excess of the treatment agent that remains after the reaction can be removed in a simple manner by filtration, decantation, or other operations. However, it is preferable to add the treatment agent in an amount of 1 to 300 wt % with respect to the difluorophosphate. In view of ease of purification operations, the treatment agent is preferably added in an amount of 1 to 100 wt % and particularly preferably 1 to 50 wt %.

In the purification method according to the present invention, although the reaction temperature at which the difluorophosphate is treated with the treatment agent can be set arbitrarily and is not limited, the treatment temperature is preferably −50 to 150° C. The treatment temperature is more preferably 0 to 100° C. and particularly preferably 20 to 80° C.

In the purification method according to the present invention, when a reaction system containing a solvent is employed and subjected to heating, it is preferable to perform reflux.

The temperature at the bottom of a reflux condenser is preferably controlled to −50° C. to 20° C., more preferably −40° C. to 10° C., and particularly preferably −30° C. to 5° C.

In the purification method according to the present invention, the difluorophosphate may be brought into contact with the treatment agent at atmospheric pressure, reduced pressure, or increased pressure. In particular, in view of ease of operations, it is preferable to bring the difluorophosphate into contact with the treatment agent at atmospheric pressure.

In the purification method according to the present invention, although the reaction time for which the difluorophosphate is treated with the treatment agent can be set arbitrarily and is not limited, the treatment time is preferably 5 minutes to 100 hours, more preferably 30 minutes to 50 hours and particularly preferably 1 to 24 hours.

In the purification method according to the present invention, after the impurity, especially the free acid component (acidic impurity) in the impurity, and the treatment agent are allowed to be mixed to form a salt or a complex, the system containing the salt or the complex may be subjected to another purification step. There is no particular limitation on the another purification step. Examples of the manner of the another purification step include removal of the salt or the complex that has been deposited, such as filtration or decantation; separation of the salt or the complex by an interaction, such as chromatography; and neutralization of an excess carbonate or hydroxide by a reaction with an acid such as hydrogen fluoride.

The difluorophosphate obtained by the purification method according to the present invention can be used as an additive for a non-aqueous electrolyte solution for a lithium ion secondary battery, an intermediate of a functional material, an intermediate of a drug, and the like. Hereinafter, an additive for a non-aqueous electrolyte solution for a lithium ion secondary battery as an embodiment of the difluorophosphate obtained by the purification method according to the present invention, and a lithium ion secondary battery in which the additive is used will be described.

The non-aqueous electrolyte solution for a secondary battery of the present invention is characterized in that at least a hexafluorophosphate and a difluorophosphate are contained in a non-aqueous solvent, and that at least a portion of the difluorophosphate is a difluorophosphate that has been purified by the purification method according to the present invention (hereinafter also referred to as the difluorophosphate of the present invention). The hexafluorophosphate is used as an electrolyte salt.

The proportion of the difluorophosphate of the present invention to the total difluorophosphate that is used for the non-aqueous electrolyte solution of the present invention is preferably 5 to 100 wt % and more preferably 50 to 100 wt %.

The difluorophosphate of the present invention has been purified so as to have an impurity content of 1 wt % or less, preferably 0.8 wt % or less, and more preferably 0.5 wt % or less.

More specifically, a free acid component (acidic impurity) is contained in an amount of preferably 0.5 wt % or less, more preferably 0.2 wt % or less, and most preferably 0.1 wt % or less. Also, an insoluble residue is contained in an amount of preferably 1 wt % or less, more preferably 0.5 wt % or less, and most preferably 0.3 wt % or less.

The content of the difluorophosphate in the non-aqueous electrolyte solution of the present invention is preferably 0.01 to 20.0 wt %, more preferably 0.05 to 15.0 wt %, and most preferably 0.10 to 10.0 wt %.

There is no particular limitation on the non-aqueous solvent that is used in the non-aqueous electrolyte solution of the present invention as long as the difluorophosphate can be dissolved in the solvent. For example, carbonates, esters, ethers, lactones, nitriles, amides, sulfones, and the like can be used, and it is preferable to use ethylene carbonate, propylene carbonate, dimethyl carbonate, diethyl carbonate, or ethyl methyl carbonate. The non-aqueous solvents may be used singly or in the form of a mixed solvent of two or more thereof.

In the non-aqueous electrolyte solution of the present invention, at least a hexafluorophosphate ($LiPF_6$ in the case of a lithium ion secondary battery) is essentially contained as the electrolyte salt to be dissolved in the non-aqueous solvent, but otherwise there is no particular limitation on the electrolyte salt. In addition, $LiPO_2F_2$, $LiBF_4$, $LiClO_4$, $LiN(CF_3SO_2)_2$, $LiN(FSO_2)_2$, $LiCF_3SO_3$, $LiC(CF_3SO_2)_3$, $LiC(FSO_2)_3$, $LiCF_3CO_2$, $LiB(CF_3SO_3)_4$, $LiB(FSO_3)_4$, $LiB(C_2O_4)_2$, $LiBF_2(C_2O_4)$, or the like can be used as the lithium salt.

The content of the electrolyte salt in the non-aqueous solvent is preferably set within a range of 20.0 to 80.0 wt % and more preferably within a range of 40.0 to 60.0 wt %.

Although the non-aqueous electrolyte solution of the present invention can be used as both a non-aqueous electrolyte solution for a primary battery and a non-aqueous electrolyte solution for a secondary battery, it is preferable to use the non-aqueous electrolyte solution of the present invention as a non-aqueous electrolyte solution constituting a lithium ion secondary battery. A lithium ion secondary battery in which the non-aqueous electrolyte solution of the present invention is used (hereinafter also referred to as a secondary battery of the present invention) will be described below.

With regard to a cathode of the secondary battery of the present invention, there may be used, for example, a cathode obtained by slurrying a cathode active material, a binder, a conductive material, and the like with a solvent, applying the slurry to a current collector, and drying and pressing the resultant.

There is no particular limitation on the cathode active material as long as the material can intercalate and deintercalate lithium ions and has a noble potential, and commonly-used known cathode active materials can be used. Examples thereof include metallic compounds such as metallic oxides, metallic hydroxides, metallic sulfides, metallic halides, and metallic phosphate compounds.

Lithium-transition metal composite oxides having a layer structure, such as metallic intercalation compounds, or lithium-transition metal composite oxides having a spinel structure or an olivine structure can also be used.

At least one metal selected from nickel, cobalt, manganese, titanium, iron, and the like is preferable as the transition metal element.

Furthermore, transition metal composite oxides obtained by addition or substitution of lithium, magnesium, aluminum, or titanium to or for these transition metal elements may also be used.

In order to obtain a secondary battery having a high energy density, it is preferable to use a lithium-transition metal composite oxide having a layer structure as the cathode active material. Specifically, a lithium-cobalt composite oxide, a lithium-cobalt-nickel-manganese composite oxide, a lithium-cobalt-nickel-aluminum composite oxide, or the like can be preferably used. The content of the cathode active material is preferably 10.0 to 99.9 wt % and more preferably 50.0 to 98.0 wt % based on the total amount of the cathode active material, the conductive material, and the binder.

Examples of the conductive material include acetylene black, Ketjen black, furnace black, needle coke, and graphite. In particular, acetylene black and graphite are preferable.

The content of the conductive material is preferably 0.05 to 50.0 wt % and more preferably 1.0 to 30.0 wt % based on the total amount of the cathode active material, the conductive material, and the binder.

Examples of the binder include polyvinylidene fluoride (PVDF), carboxymethyl cellulose (CMC), styrene-butadiene rubber (SBR), polyvinyl alcohol (PVA), polyvinyl chloride (PVC), polypropylene (PP), and polybutadiene (BR). In particular, polyvinylidene fluoride (PVDF), carboxymethyl cellulose (CMC), and styrene-butadiene rubber (SBR) are preferable.

The content of the binder is preferably 0.05 to 50.0 wt % and more preferably 1.0 to 30.0 wt % based on the total amount of the cathode active material, the conductive material, and the binder.

Examples of the slurrying solvent include aqueous solvents, such as water and alcohols, and organic solvents, such as N-methyl-2-pyrrolidone (NMP), dimethylformamide, methyl acetate, and N,N-dimethylaminopropylamine Among the aqueous solvents, water is preferable. Among the organic solvents, NMP is preferable. The amount of the solvent to be used is preferably 20.0 to 90.0 parts by weight and more preferably 30.0 to 80.0 parts by weight with respect to 100 parts by weight of the cathode active material.

Aluminum, stainless steel, and nickel or copper steel materials can be used as the current collector of the cathode.

With regard to an anode of the secondary battery of the present invention, there may be used, similarly to the case of the cathode, an anode obtained by slurrying an anode active material, a binder, a conductive material, and the like with a solvent, applying the slurry to a current collector, and drying and pressing the resultant.

There is no particular limitation on the anode active material as long as the material can intercalate and deintercalate lithium ions, and commonly-used known anode active materials can be used.

For example, metallic lithium, lithium alloys such as lithium-silicon alloys and lithium-tin alloys, tin or titanium compounds such as tin-silicon alloys, lithium-titanium alloys, tin-titanium alloys, and titanium oxides, carbon materials, conductive polymers, and the like can be used.

Examples of the carbon materials include graphite (natural graphite and artificial graphite), coke (petroleum coke and coal coke), fullerenes, carbon nanotubes, carbon fibers, and fired products of organic matter.

Metallic oxides, such as $SnO_2$, $SnO$, and $TiO_2$, that have a lower potential than the cathode active material can be used as the tin or titanium compounds.

In particular, it is preferable to use as the anode active material a carbon material whose volume change due to intercalation and deintercalation of lithium is small and which has excellent reversibility, such as crystalline graphite.

With regard to the binder, the conductive material, and the slurrying solvent of the anode, the same materials as those described for the cathode above can be used in the same manner (content, etc.).

Copper, nickel, stainless steel, nickel-plated steel, and the like can be used as the current collector of the anode.

Moreover, a separator (porous membrane) for preventing short-circuiting is preferably interposed between the cathode and the anode. In this case, the non-aqueous electrolyte solution is used in a state in which the separator is impregnated with the non-aqueous electrolyte solution. There is no particular limitation on the material and shape of the porous membrane as long as the porous membrane is stable against the electrolyte solution and has excellent liquid retention, and a porous sheet or a nonwoven fabric made of polyolefin such as polypropylene or polyethylene is preferable.

The porous sheet can be made of, for example, polyethylene, polypropylene, polyvinylidene fluoride, polyvinylidene chloride, polyacrylnitrile, polyacrylamide, polycarbonate, polyamide, polyimide, polytetrafluoroethylene, poly(meth)acrylic acid, or a copolymer or a mixture thereof.

There is no particular limitation on the shape of the secondary battery of the present invention having the above-described configuration, and the secondary battery of the present invention may be of any shape such as a coin shape, a cylindrical shape, a rectangular shape, and a pouch shape.

EXAMPLES

Hereinafter, the present invention will be described more specifically using examples. However, the present invention is not limited to these examples. The purity of a product was quantified from the relative area of difluorophosphate ions by performing anion analysis by ion chromatography. A free acid component (acidic impurity) was quantified in terms of HF by neutralization titration using NaOH. The amount of insoluble residue was measured by the following manner: an difluorophosphate obtained was dissolved in 1,2-dimethoxyethane, and the resulting solution was passed through a polytetrafluoroethylene membrane filter, followed by quantify the residue on the filter as the insoluble residue. With respect to the amount of insoluble residue of Examples 6 and 7, the amount of insoluble residue was measured as follows: a predetermined amount of a filtrate or supernatant was diluted with 1,2-dimethoxyethane to a predetermined volume using a volumetric flask, and the resulting solution was passed through a polytetrafluoroethylene membrane filter, followed by quantify the residue on the filter as the insoluble residue.

Example 1

Synthesis of Lithium Difluorophosphate

A difluorophosphate was synthesized in the following manner by reference to the method of Example 2 disclosed in JP 2015-044701A.

First, 100.1 g (0.66 mol) of lithium hexafluorophosphate in granular form was placed into a 500-mL bottle made of PFA. The bottle under a nitrogen seal was put in a shaking apparatus. Then, 27.4 g (1.52 mol) of pure water and 259.7 g (2.18 mol) of thionyl chloride were introduced at rates of 0.2 g/min and 1.7 g/min into the bottle, respectively, and the mixture was reacted at 25° C. for 22 hours. The obtained crystals were dried under a nitrogen stream in a dryer at 120° C., and thus 60.2 g of crude lithium difluorophosphate was obtained. The obtained crystals were analyzed by ion chromatography, and it was found that lithium difluorophosphate obtained had a purity of 88% in terms of relative area. Moreover, the content of the free acid component (acidic impurity) was 0.161 wt %, and the content of the insoluble residue was 5.56 wt %.

Purification of Lithium Difluorophosphate

First, 50 g of lithium difluorophosphate obtained above and 650 g of ethyl acetate were placed into a recovery flask having a capacity of 1 L. Under a nitrogen seal at 1 L/min, the recovery flask was held in a thermostatic bath set at 60° C. for 30 min After that, 5 g of lithium carbonate was put into the recovery flask, followed by stirring. An hour later, the mixture was cooled to room temperature. Subsequently, the obtained mixture liquid was passed through a membrane filter. After that, the solvent was distilled off from the filtrate using a rotary evaporator, and thus 42 g of white crystals of lithium difluorophosphate was obtained. Lithium difluorophosphate thus obtained through the purification was analyzed by ion chromatography, and it was found that lithium difluorophosphate thus obtained had a purity of 99% or more in terms of relative area. Moreover, the content of the free acid component (acidic impurity) was 55 ppm, and the content of the insoluble residue was 849 ppm.

Example 2

Synthesis of Lithium Difluorophosphate 58.9 g of white crystals of lithium difluorophosphate was obtained in the same manner as in Example 1 above. The obtained crystals were analyzed by ion chromatography, and it was found that lithium difluorophosphate thus obtained had a purity of 85% in terms of relative area. Moreover, the content of the free acid component (acidic impurity) was 3.70 wt %, and the content of the insoluble residue was 5.15 wt %.

Purification of Lithium Difluorophosphate

First, 50 g of lithium difluorophosphate obtained above and 200 g of 1,2-dimethoxyethane were placed into a recovery flask having a capacity of 500 ml. Under a nitrogen seal at 1 L/min, the recovery flask was held in a thermostatic bath set at 60° C. for 30 min After that, 10 g of lithium carbonate was put into the recovery flask, followed by stirring. An hour later, the mixture was cooled to room temperature. Subsequently, the obtained mixture liquid was passed through a membrane filter. After that, the solvent was distilled off from the filtrate using a rotary evaporator, and thus 45 g of white crystals of lithium difluorophosphate was obtained. Lithium difluorophosphate thus obtained through the purification was analyzed by ion chromatography, and it was found that lithium difluorophosphate thus obtained had a purity of 99% or more in terms of relative area. Moreover, the content of free acid component (acidic impurity) was 60 ppm, and the content of the insoluble residue was 337 ppm.

Example 3

Synthesis of Lithium Difluorophosphate 63 g of lithium difluorophosphate was obtained in the same manner as in Example 1 above. The obtained crystals were analyzed by ion chromatography, and it was found that lithium difluorophosphate thus obtained had a purity of 84% in terms of relative area. Moreover, the content of the free acid component (acidic impurity) was 0.155 wt %, and the content of the insoluble residue was 5.48 wt %.

Purification of Lithium Difluorophosphate

First, 50 g of lithium difluorophosphate obtained above and 200 g of 1,2-dimethoxyethane were placed into a recovery flask having a capacity of 500 ml. Under a nitrogen seal at 1 L/min, the recovery flask was held in a thermostatic bath set at 60° C. for 30 min After that, 2 g of lithium hydroxide was put into the recovery flask, followed by stirring. An hour later, the mixture was cooled to room temperature. Subsequently, the obtained mixture liquid was passed through a membrane filter. After that, the solvent was distilled off from the filtrate using a rotary evaporator, and thus 45 g of white crystals of lithium difluorophosphate was obtained. Lithium difluorophosphate thus obtained through the purification was analyzed by ion chromatography, and it was found that lithium difluorophosphate thus obtained had a purity of 99% or more in terms of relative area. Moreover, the content of the free acid component (acidic impurity) was 884 ppm, and the content of the insoluble residue was 1209 ppm.

Example 4

Synthesis of Lithium Difluorophosphate 59 g of lithium difluorophosphate was obtained in the same manner as in Example 1 above. The obtained crystals were analyzed by ion chromatography, and it was found that lithium difluorophosphate thus obtained had a purity of 89% in terms of relative area. Moreover, the content of the free acid component (acidic impurity) was 0.128 wt %, and the content of the insoluble residue was 4.73 wt %.

Purification of Lithium Difluorophosphate

First, 50 g of lithium difluorophosphate obtained above and 200 g of 1,2-dimethoxyethane were placed into a recovery flask having a capacity of 500 ml. Under a nitrogen seal at 1 L/min, the recovery flask was held in a thermostatic bath set at 60° C. for 30 min After that, 20 g of lithium fluoride was put into the recovery flask, followed by stirring. An hour later, the mixture was cooled to room temperature. Subsequently, the obtained mixture liquid was passed through a membrane filter. After that, the solvent was distilled off from the filtrate using a rotary evaporator, and thus 45 g of white crystals of lithium difluorophosphate was obtained. Lithium difluorophosphate thus obtained through the purification was analyzed by ion chromatography, and it was found that lithium difluorophosphate thus obtained had a purity of 99% or more in terms of relative area. Moreover, the content of the free acid component (acidic impurity) was 675 ppm, and the content of the insoluble residue was 823 ppm.

Example 5

Synthesis of Lithium Difluorophosphate 62 g of lithium difluorophosphate was obtained in the same manner as in Example 1 above. The obtained crystals were analyzed by ion chromatography, and it was found that lithium difluorophosphate thus obtained had a purity of 91% in terms of relative area. Moreover, the content of the free acid component (acidic impurity) was 0.238 wt %, and the content of the insoluble residue was 5.28 wt %.

Purification of Lithium Difluorophosphate

First, 50 g of lithium difluorophosphate obtained above and 200 g of 1,2-dimethoxyethane were placed into a recovery flask having a capacity of 500 ml. Under a nitrogen seal at 1 L/min, the recovery flask was held in a thermostatic bath set at 60° C. for 30 min After that, 20 g of poly(4-vinylpyridine) was put into the recovery flask, followed by stirring. An hour later, the mixture was cooled to room temperature. Subsequently, the obtained mixture liquid was passed through a membrane filter. After that, the solvent was distilled off from the filtrate using a rotary evaporator, and thus 45 g of white crystals of lithium difluorophosphate was obtained. Lithium difluorophosphate thus obtained through the purification was analyzed by ion chromatography, and it was found that lithium difluorophosphate thus obtained had a purity of 99% or more in terms of relative area. Moreover, the content of the free acid component (acidic impurity) content was 267 ppm, and the content of the insoluble residue was 918 ppm.

Example 6

Synthesis of Lithium Difluorophosphate 58 g of lithium difluorophosphate was obtained in the same manner as in Example 1 above. The obtained crystals were analyzed by ion chromatography, and it was found that lithium difluorophosphate thus obtained had a purity of 87% in terms of relative area. Moreover, the content of the free acid component (acidic impurity) was 4.72 wt %, and the content of the insoluble residue was 6.89 wt %.

Purification of Lithium Difluorophosphate

First, 50 g of lithium difluorophosphate obtained above and 200 g of 1,2-dimethoxyethane were placed into a recovery flask having a capacity of 500 ml. Under a nitrogen seal at 1 L/min, the recovery flask was held in a thermostatic bath set at 60° C. for 30 min After that, 10 g of lithium carbonate was put into the recovery flask, followed by stirring. An hour later, the mixture was cooled to room temperature. Subsequently, the obtained mixture liquid was passed through a membrane filter. The obtained filtrate (containing lithium difluorophosphate in an amount of 20 wt %) was analyzed, and it was found that the content of the free acid component (acidic impurity) was 34 ppm with respect to lithium difluorophosphate. Moreover, the content of the insoluble residue was 430 ppm.

Example 7

Synthesis of Lithium Difluorophosphate 61 g of lithium difluorophosphate was obtained in the same manner as in Example 1 above. The obtained crystals were analyzed by ion chromatography, and it was found that lithium difluorophosphate thus obtained had a purity of 82% in terms of relative area. Moreover, the content of the free acid component (acidic impurity) was 0.182 wt %, and the content of the insoluble residue was 4.64 wt %.

Purification of Lithium Difluorophosphate

First, 50 g of lithium difluorophosphate obtained above and 200 g of 1,2-dimethoxyethane were placed into a recovery flask having a capacity of 500 ml. Under a nitrogen seal at 1 L/min, the recovery flask was held in a thermostatic bath set at 60° C. for 30 min. After that, 10 g of lithium carbonate was put into the recovery flask, followed by stirring. An hour later, the mixture was cooled to room temperature. Subsequently, the obtained mixture liquid was left to stand to thereby allow lithium carbonate to settle out. A supernatant that did not contain lithium carbonate was taken out, and the obtained fluid (containing lithium difluorophosphate in an amount of 20 wt %) was analyzed. As a result, no free acid component (acidic impurity) was observed, and the content of the insoluble residue was 2790 ppm.

Example 8

Provision of Lithium Difluorophosphate 0.04 g of lithium dihydrogen phosphate was added to 6 g of lithium difluorophosphate after the purification described in Example 2 above. The content of a free acid component (acidic impurity) in the resultant was measured and found to be 0.014 wt %.

Purification of Lithium Difluorophosphate

First, 5 g of lithium difluorophosphate provided above and 20 g of 1,2-dimethoxyethane were placed into a recovery flask having a capacity of 100 ml. Under a nitrogen seal at 1 L/min, the recovery flask was held in a thermostatic bath set at 60° C. for 30 min. After that, 1 g of lithium carbonate was put into the recovery flask, followed by stirring. An hour later, the mixture was cooled to room temperature. Subsequently, the obtained mixture liquid was passed through a membrane filter. After that, the solvent was distilled off from the filtrate using a rotary evaporator, and thus 4 g of white crystals of lithium difluorophosphate was obtained. Lithium difluorophosphate thus obtained through the purification was analyzed by ion chromatography, and it was found that lithium difluorophosphate thus obtained had a purity of 99% or more in terms of relative area. Moreover, the content of the free acid component (acidic impurity) was 24 ppm, and the content of the insoluble residue was 510 ppm.

Comparative Example 1

Synthesis of Lithium Difluorophosphate 120 g of lithium difluorophosphate was obtained in the same manner as in Example 1 above. The obtained crystals were analyzed by ion chromatography, and it was found that lithium difluorophosphate thus obtained had a purity of 88% in terms of relative area. Moreover, the content of the free acid component (acidic impurity) was 0.566 wt %, and the content of the insoluble residue was 6.25 wt %.

Difluorophosphate obtained above was purified in the following manner by reference to the method of Example 1 disclosed in JP 2015-013795A.

First, 100 g of lithium difluorophosphate was placed into a PFA container having a capacity of 250 mL, and under a nitrogen flow at 1 L/min, the container was held in a thermostatic bath set at 130° C. for 1 hour. After that, while the container was still held in the thermostatic bath at 130° C., the aeration gas was changed from nitrogen alone to a nitrogen gas containing 40 vol % of HF, and the flow rate was changed to 10 L/min Aeration with the nitrogen gas containing HF was performed for 1 hour. Furthermore, the aeration gas was changed again to the nitrogen gas at a flow rate of 1 L/min Aeration with the nitrogen gas was performed for 10 hours while the temperature was maintained at 130° C. After that, the system was cooled to room temperature. Thus, 93 g of white crystals of lithium difluorophosphate was obtained. Lithium difluorophosphate thus obtained through the purification was analyzed by ion chromatography, and it was found that lithium difluorophosphate thus obtained had a purity of 79% in terms of relative area. Moreover, the content of the free acid component (acidic impurity) was 3979 ppm, and the content of the insoluble residue was 121149 ppm.

TABLE 1

| | Free acid component prior to purification (wt %) | Insoluble residue prior to purification (wt %) | Free acid component after purification (ppm) | Insoluble residue after purification (ppm) |
|---|---|---|---|---|
| Ex. 1 | 0.161 | 5.56 | 55 | 849 |
| Ex. 2 | 3.700 | 5.15 | 60 | 337 |
| Ex. 3 | 0.155 | 5.48 | 884 | 1209 |
| Ex. 4 | 0.128 | 4.73 | 675 | 823 |
| Ex. 5 | 0.238 | 5.28 | 267 | 918 |
| Ex. 6 | 4.720 | 6.89 | 34 | 430 |
| Ex. 7 | 0.182 | 4.64 | ND | 2790 |
| Ex. 8 | 0.014 | — | 24 | 510 |
| Comp. Ex. 1 | 0.566 | 6.25 | 3979 | 121149 |

ND means "not detected".

Evaluation of Battery

With respect to secondary batteries in which a non-aqueous electrolyte solution containing a difluorophosphate was used, an evaluation test for confirming the effect of addition of the difluorophosphate was conducted.

In the evaluation test herein, an electrolyte solution containing lithium difluorophosphate was used, and a secondary battery in the form of a pouch cell was produced. The evaluation test will be described in detail below.

Example 9

Production of $LiCoO_2$ Cathode

First, 93 parts by weight of $LiCoO_2$ serving as the cathode active material, 4 parts by weight of acetylene black serving as the conductive material, and 3 parts by weight of polyvinylidene fluoride (PVDF) serving as the binder were mixed to obtain a cathode material. This cathode material was dispersed in N-methyl-2-pyrrolidone (NMP) to form a slurry. This slurry was applied to one side of a cathode current collector made of aluminum, dried, and then press-formed, and thus a $LiCoO_2$ cathode was produced.

Production of Graphite Anode

First, 97.0 parts by weight of artificial graphite serving as the anode active material, and 2.0 parts by weight of styrene-butadiene rubber (SBR) and 1.0 part by weight of carboxymethyl cellulose (CMC) serving as the binders were mixed to obtain an anode material. This anode material was dispersed in water to form a slurry. This slurry was applied to one side of an anode current collector made of copper, dried, and then press-formed, and thus a graphite anode was produced.

Assembly of Battery

Here, for a pouch cell, the above-described cathode and anode and a separator made of polyethylene were stacked in the order of the anode, the separator, and the cathode to produce a battery element. This battery element was inserted into a bag such that terminals of the cathode and the anode protruded therefrom, the bag being made of a laminated film having an aluminum layer and resin layers respectively applied to both surfaces of the aluminum layer. Then, the electrolyte solution was injected into the bag, followed by vacuum sealing, and thus a pouch cell was produced.

Preparation of Electrolyte Solution

Ethylene carbonate (EC) and ethyl methyl carbonate (EMC) were mixed in a volume ratio of EC:EMC=3:7 to obtain a non-aqueous solvent. Lithium hexafluorophosphate ($LiPF_6$) serving as the electrolyte was dissolved in the obtained non-aqueous solvent to a concentration of 1.1 mol/L. Lithium difluorophosphate after the purification of Example 1 was added to this solution in an amount of 1 wt % to prepare a non-aqueous electrolyte solution, which was used for producing a secondary battery in the form of a pouch cell according to the above-described procedures.

Comparative Example 2

A secondary battery in the form of a pouch cell was produced in the same manner as in Example 9 except that a non-aqueous electrolyte solution was prepared using lithium difluorophosphate prior to the purification of Example 1.

Evaluation of Battery

Each of the produced secondary batteries was charged at a constant current corresponding to 0.2 C at 25° C. to 4.2 V, further charged at a constant voltage of 4.2 V until the current value reached 0.02 C, and then discharged at a constant current of 0.2 C to 2.7 V to obtain an initial discharge capacity. After that, two more cycles of the charging and discharging were performed under the same conditions to stabilize the battery. Here, 1 C represents a current value at which a reference capacity of a battery is discharged in 1 hour; 5 C represents a current value five times as high as the current value of 1 C; and 0.1 C and 0.2 C represent current values that are 1/10 and 1/5 of the current value of 1 C, respectively.

Evaluation of Impedance at −10° C.

Each battery which had been subjected to the measurement of the initial discharge capacity and then stabilized was charged at a constant current of 0.2 C at 25° C. to 4.2 V, further charged at a constant voltage of 4.2 V until the current value reached 0.02 C, and then discharged at a constant current of 0.2 C so as to have a capacity equal to one-half the initial discharge capacity. The impedance of this battery was measured by applying an alternating voltage amplitude of 10 mV at −10° C., and a real axis resistance at 0.03 Hz was obtained. Table 2 shows the evaluation results.

TABLE 2

| | Additive | Amount added | Impedance at −10° C. |
|---|---|---|---|
| Ex. 9 | Lithium difluorophosphate | 1 wt % | 10 Ω |
| Comp. Ex. 2 | Lithium difluorophosphate prior to purification | 1 wt % | 19 Ω |

From Table 2, it was confirmed that, in secondary batteries, the resistance value was decreased by reducing the free acid component and the insoluble residue by performing the purification treatment.

INDUSTRIAL APPLICABILITY

By the method for purifying a difluorophosphate according to the present invention, a difluorophosphate having a high purity can be obtained in a simple manner using only inexpensive raw materials. Moreover, according to the present invention, a by-product forms a salt or a complex that has a low solubility, and therefore can be removed in a simple manner by filtration, decantation, or the like. Furthermore, by the method according to the present invention, the free acid component (acidic impurity) and the insoluble residue can be minimized

The invention claimed is:

1. A method for purifying a difluorophosphate, the method comprising:
    dissolving difluorophosphate containing an impurity in a solvent to form a solution;
    mixing at least one treatment agent with the solution to isolate the impurity contained in the difluorophosphate;
    wherein at least one treatment agent is selected from the group consisting of alkali metal carbonates, alkali metal hydroxides, alkali metal halides, alkaline earth metal carbonates, alkaline earth metal hydroxides, and alkaline earth metal halides.

2. The method for purifying a difluorophosphate according to claim 1, further comprising filtering off, by filtration, a salt or a complex that has been formed by allowing the impurity to be mixed with the treatment agent.

3. The method for purifying a difluorophosphate according to claim 1, wherein the treatment agent is a carbonate, a hydroxide, or a halide of an alkali metal.

4. The method for purifying a difluorophosphate according to claim 1, wherein the treatment agent is a carbonate, a hydroxide, or a halide of lithium.

5. The method for purifying a difluorophosphate according to claim 1, wherein a reaction between the impurity and the treatment agent is conducted in a solvent.

6. The method for purifying a difluorophosphate according to claim 5, wherein the solvent is an acetate ester, an ester of a phosphorus acid, a nitrile compound, an amide compound, an alcohol, or an alkane.

7. The method for purifying a difluorophosphate according to claim 2, wherein the treatment agent is a carbonate, a hydroxide, or a halide of an alkali metal.

8. The method for purifying a difluorophosphate according to claim 2, wherein the treatment agent is a carbonate, a hydroxide, or a halide of lithium.

9. The method for purifying a difluorophosphate according to claim 3, wherein the treatment agent is a carbonate, a hydroxide, or a halide of lithium.

10. The method for purifying a difluorophosphate according to claim 2, wherein a reaction between the impurity and the treatment agent is conducted in a solvent.

11. The method for purifying a difluorophosphate according to claim 3, wherein a reaction between the impurity and the treatment agent is conducted in a solvent.

12. The method for purifying a difluorophosphate according to claim 4, wherein a reaction between the impurity and the treatment agent is conducted in a solvent.

13. The method for purifying a difluorophosphate according to claim 7, wherein a reaction between the impurity and the treatment agent is conducted in a solvent.

14. The method for purifying a difluorophosphate according to claim 8, wherein a reaction between the impurity and the treatment agent is conducted in a solvent.

15. The method for purifying a difluorophosphate according to claim 9, wherein a reaction between the impurity and the treatment agent is conducted in a solvent.

16. A method for purifying a difluorophosphate, the method comprising:
    mixing a difluorophosphate containing an impurity with at least one treatment agent selected from the group consisting of amines to isolate the impurity contained in the difluorophosphate.

17. The method for purifying a difluorophosphate according to claim 16, further comprising filtering off, by filtration, a salt or a complex that has been formed by allowing the impurity to be mixed with the treatment agent.

18. The method for purifying a difluorophosphate according to claim 16, wherein a reaction between the impurity and the treatment agent is conducted in a solvent.

19. The method for purifying a difluorophosphate according to claim 17, wherein a reaction between the impurity and the treatment agent is conducted in a solvent.

20. The method for purifying a difluorophosphate according to claim 1, wherein a dried difluorophosphate containing an impurity is dissolved in a solvent.

* * * * *